(12) United States Patent
Talaski (10) Patent No.: US 8,499,787 B2
(45) Date of Patent: *Aug. 6, 2013

(54) PRESSURE CONTROL VALVE

(75) Inventor: Edward J. Talaski, Caro, MI (US)

(73) Assignee: TI Group Automotive Systems, L.L.C., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/835,146

(22) Filed: Jul. 13, 2010

(65) Prior Publication Data

US 2010/0276623 A1 Nov. 4, 2010

Related U.S. Application Data

(60) Division of application No. 11/451,756, filed on Jun. 13, 2006, now Pat. No. 7,766,034, which is a continuation-in-part of application No. 10/624,174, filed on Jul. 22, 2003, now abandoned.

(51) Int. Cl.
*F16K 15/04* (2006.01)
(52) U.S. Cl.
USPC .................. 137/539; 137/543.17; 137/543.19
(58) Field of Classification Search
USPC .................. 137/539, 533.11, 543.17, 543.19, 137/540
See application file for complete search history.

(56) References Cited

U.S. PATENT DOCUMENTS

| | | | |
|---|---|---|---|
| 185,210 A | 12/1876 | Carricaburu | |
| 1,935,978 A | 11/1933 | Harbison | |
| 2,339,101 A * | 1/1944 | Parker | 137/514.5 |
| 3,010,435 A | 11/1961 | Abrams | |
| 3,148,697 A | 9/1964 | Carricaburu | |
| 4,291,660 A | 9/1981 | Molyneaux | |
| 4,665,940 A | 5/1987 | Jacobson | |
| 4,697,613 A | 10/1987 | Wienck | |
| 4,964,391 A | 10/1990 | Hoover | |
| 5,065,790 A | 11/1991 | Kornas | |
| 5,374,167 A | 12/1994 | Merbold | |
| 5,421,306 A | 6/1995 | Talaski | |
| 5,582,204 A | 12/1996 | Hiranuma et al. | |
| 6,047,907 A | 4/2000 | Hornby | |
| 6,382,380 B1 | 5/2002 | Shimada et al. | |
| 2007/0068580 A1 | 3/2007 | Van Der Linden et al. | |

FOREIGN PATENT DOCUMENTS

| | | |
|---|---|---|
| CA | 2264497 | 9/2000 |
| DE | 100 14 191 A1 | 9/2001 |
| JP | 55-157163 | 4/1979 |
| WO | WO 98/57082 | 12/1998 |
| WO | WO 02/25148 A1 | 3/2002 |

* cited by examiner

*Primary Examiner* — William McCalister
(74) *Attorney, Agent, or Firm* — Reising Ethington P.C.

(57) ABSTRACT

A pressure control valve has a non-uniformly tapered valve bore that has an increasing diameter as it extends downstream. An interface angle, defined in part between a valve ball and the valve bore in the area of the smallest gap between them, increases as the valve ball is increasingly displaced away from a valve seat of the valve bore.

24 Claims, 7 Drawing Sheets

PRESSURE CONTROL VALVE

REFERENCE TO RELATED APPLICATIONS

This application is a division of U.S. patent application Ser. No. 11/451,756, filed Jun. 13, 2006, which issued as U.S. Pat. No. 7,766,034 on Aug. 3, 2010, which was a continuation-in-part of U.S. patent application Ser. No. 10/624,174, filed Jul. 22, 2003, now abandoned.

FIELD OF THE INVENTION

This invention relates to a valve, and more particularly to a fluid pressure control valve.

BACKGROUND OF THE INVENTION

Hydraulic circuits incorporate valves such as pressure relief valves for various reasons, including to protect components, and to ensure the operational safety of the system. There are various valves in the prior art that are used to control the pressure of fluids, which include liquids and gases. One valve uses a sphere or valve ball yieldably biased by a spring or other mechanism against a valve seat to seal the valve and control the, "cracking" or initial opening pressure, and relief pressure. Once the cracking pressure is reached, the valve ball is forced off of the valve seat, and fluid flows through the valve seat. The valve ball moves back onto the valve seat by the biasing mechanism when the pressure is reduced and the relief pressure is reached.

Valves having a valve bore of a cylindrical or frustoconical shape can have undesirable changes in operating pressure at various flow rates, including especially, high flow rates. These valves typically require unduly increased fluid pressure to cause increased valve opening, and this can cause, for example, variation in operating characteristics relative to fluid flow rate.

SUMMARY OF THE INVENTION

A pressure control valve has a non-uniformly tapered valve bore that has an increasing diameter as it extends downstream. An interface angle, defined between a valve ball and the valve bore in the area of the smallest gap between them, increases as the valve ball is increasingly displaced away from a valve seat of the valve bore.

As the interface angle increases, the effective surface area of the valve ball acted upon by upstream fluid pressure increases, providing increased force acting on the ball from the upstream fluid. In this regard, the change in the interface angle, and hence the change in the effective surface area of the valve ball, can be controlled with regard, for example, to the spring constant of a spring that yieldably biases the ball against the valve seat. In one form, the valve can be used as a pressure relief valve and the interface angle and hence, the effective surface area of the valve ball, can be made to offset the increased spring force acting on the valve ball as it is increasingly displaced away from the valve seat. Thus, a relatively flat or constant pressure curve can be obtained for the relief valve over a wide range of fluid flow rates. Of course, the valve can be used in applications other than as a pressure relief valve.

In one presently preferred embodiment, the valve bore has a frustoconical portion defining the valve seat and a concave portion downstream of the frustoconical portion, with the concave portion being non-linearly or non-uniformly and preferably arcuately tapered. In another presently preferred embodiment, the valve bore has a plurality of straight, linearly tapered segments disposed at varying angles such that the valve bore does not have a straight or constant linear taper along its entire axial length.

BRIEF DESCRIPTION OF THE DRAWINGS

These and other objects, features and advantages of the present invention will be apparent from the following detailed description of the preferred embodiments, appended claims and accompanying drawings in which:

DETAILED DESCRIPTION OF THE PREFERRED EMBODIMENTS

Figure 1:
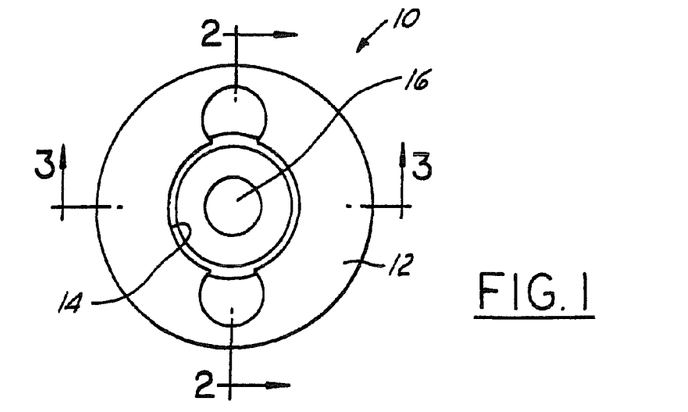
FIG. 1 is an end view of a pressure control valve according to one presently preferred embodiment of the invention.
Figure 2:
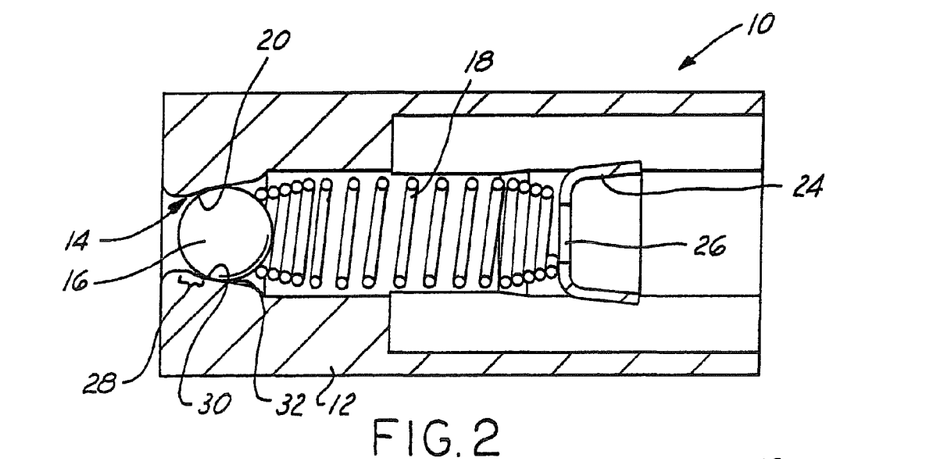
FIG. 2 is a cross-sectional view taken generally along line 2-2 in FIG. 1.
Figure 3:
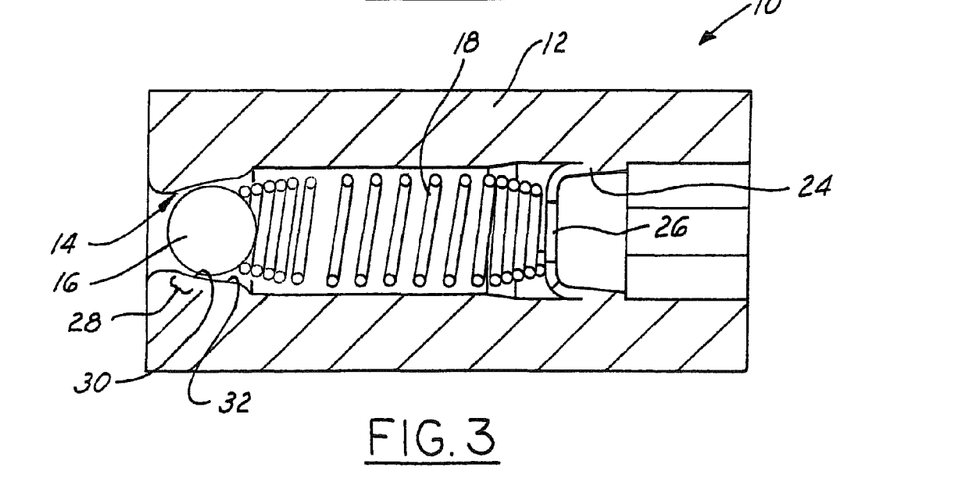
FIG. 3 is a cross-sectional view taken generally along line 3-3 in FIG. 1.
Figure 4:
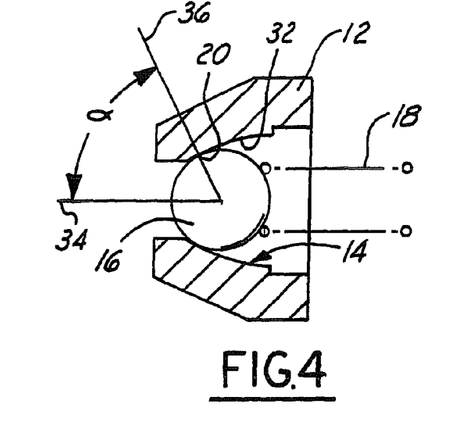
FIG. 4 is a fragmentary sectional view of another embodiment of a pressure control valve illustrating a valve ball in its closed position on a valve seat.
Figure 5:
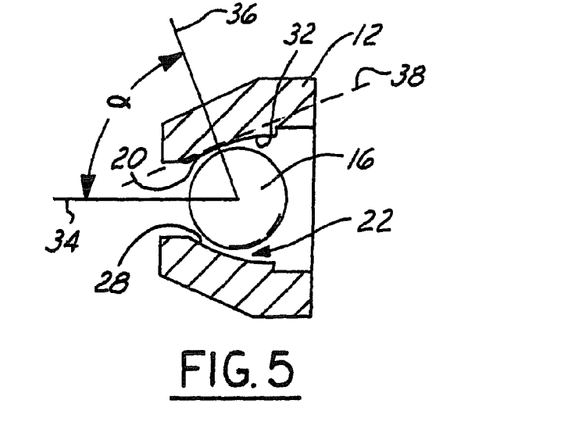
FIG. 5 is a fragmentary sectional view like FIG. 4 illustrating the valve ball displaced a first distance from the valve seat.
Figure 6:
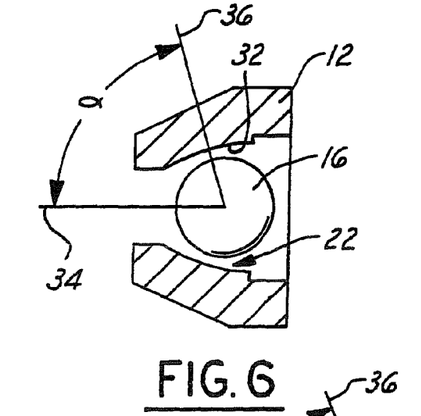
FIG. 6 is a fragmentary sectional view like FIG. 4 illustrating the valve ball displaced a second distance from the valve seat.
Figure 7:
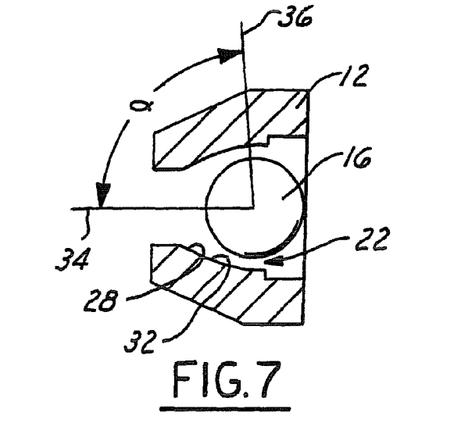
FIG. 7 is a fragmentary sectional view like FIG. 4 illustrating the valve ball displaced a third distance from the valve seat.

Referring in more detail to the drawings, FIGS. 1-3 illustrate a pressure control valve 10 having a valve body 12 with a valve bore 14 formed therein, and a valve head 16, shown in this embodiment as a spherical ball, disposed within the valve bore 14 to control the flow of fluid through the bore. In one presently preferred embodiment, the pressure control valve 10 acts as a pressure relief valve. The valve ball 16 is yieldably biased, such as by a spring 18, against a valve seat 20 portion of the valve bore 14 which has a diameter smaller than the diameter of the valve ball. When the valve ball 16 is seated against the valve seat 20, fluid does not flow through the valve bore 14. When the pressure of fluid upstream of the valve seat 20 exceeds a predetermined maximum fluid pressure, the valve ball 16 is displaced by the force of the fluid against the force of the spring 18, providing a flow area or a gap 22 (e.g. as shown in FIGS. 5-7) between the valve ball 16 and the valve bore 14 through which fluid may flow. When the pressure of the fluid drops below the predetermined maximum fluid pressure, the valve ball 16 again will become seated on the valve seat 20.

The operating pressure of the valve 10 can be controlled by the initial spring force and the spring rate of the spring 18 that yieldably biases the valve ball 16 against the valve seat 20. The initial spring force can be changed by varying the initial compression of the spring 18, such as by adjusting the position of a spring seat 24 preferably pressed into the valve bore 14 behind the spring 18. The spring seat 24 preferably has an interference fit with the valve bore 14 and includes an opening 26 through which fluid may flow.

In the presently preferred embodiment, the valve seat 20 is defined in a generally linearly tapered or frustoconical portion 28 of the valve bore 14. This frustoconical portion 28 extends axially and radially outwardly as it extends downstream to a transition point 30 at the downstream end of the frustoconical portion. Downstream of the transition 30, a concave portion 32 is formed in the valve bore 14.

The concave portion 32 has a diameter that increases from its upstream end to its downstream end. The diameter of the concave portion 32 does not increase linearly as in the frustoconical section 28. Rather, the valve bore 14 in the area of the concave portion 32 is somewhat curved or arcuate. Accordingly, as the concave portion 32 extends downstream, its diameter increases as a function of the curvature of the valve bore 14 in this area. The minimum gap or flow area 22 between the valve body 12 and the valve ball 16 varies as a function of the axial displacement of the valve ball 16 away from the valve seat 20. The minimum gap or flow area 22 is defined by the portion of the valve bore 14 that is closest to the valve ball 16, and this changes as the valve ball is displaced relative to the valve seat.

As shown in FIGS. 4-7, which illustrate an alternate embodiment valve having a valve bore of slightly different shape than in FIGS. 1-3, an interface angle $\alpha$ is defined between an axis 34 of the valve bore 14, and an interface line 36 that defines the shortest distance between the valve head and the valve bore 14. In other words, the interface line 36 connects the point on the valve head and the point on the valve bore 14 that define the minimum gap between the valve head and valve bore. With a spherical valve ball 16 as the valve head, the interface line 36 intersects the center of the valve ball 16 and the surface of the valve bore 14 closest to the valve ball 16. As shown in FIG. 5, at least with a curved or arcuate concave portion 32 and a spherical valve ball 16, the interface line 36 is perpendicular to a line 38 tangent to the valve bore at the location of the valve bore that is closest to the valve ball for a particular axial position of the valve ball. As illustrated in FIGS. 4-7, the interface angle $\alpha$ increases as the valve ball 16 is displaced further away from the valve seat 20. This is due to the non-uniform increase in the diameter of the concave portion 32 of the valve bore 14 as it extends downstream.

Figure 9:
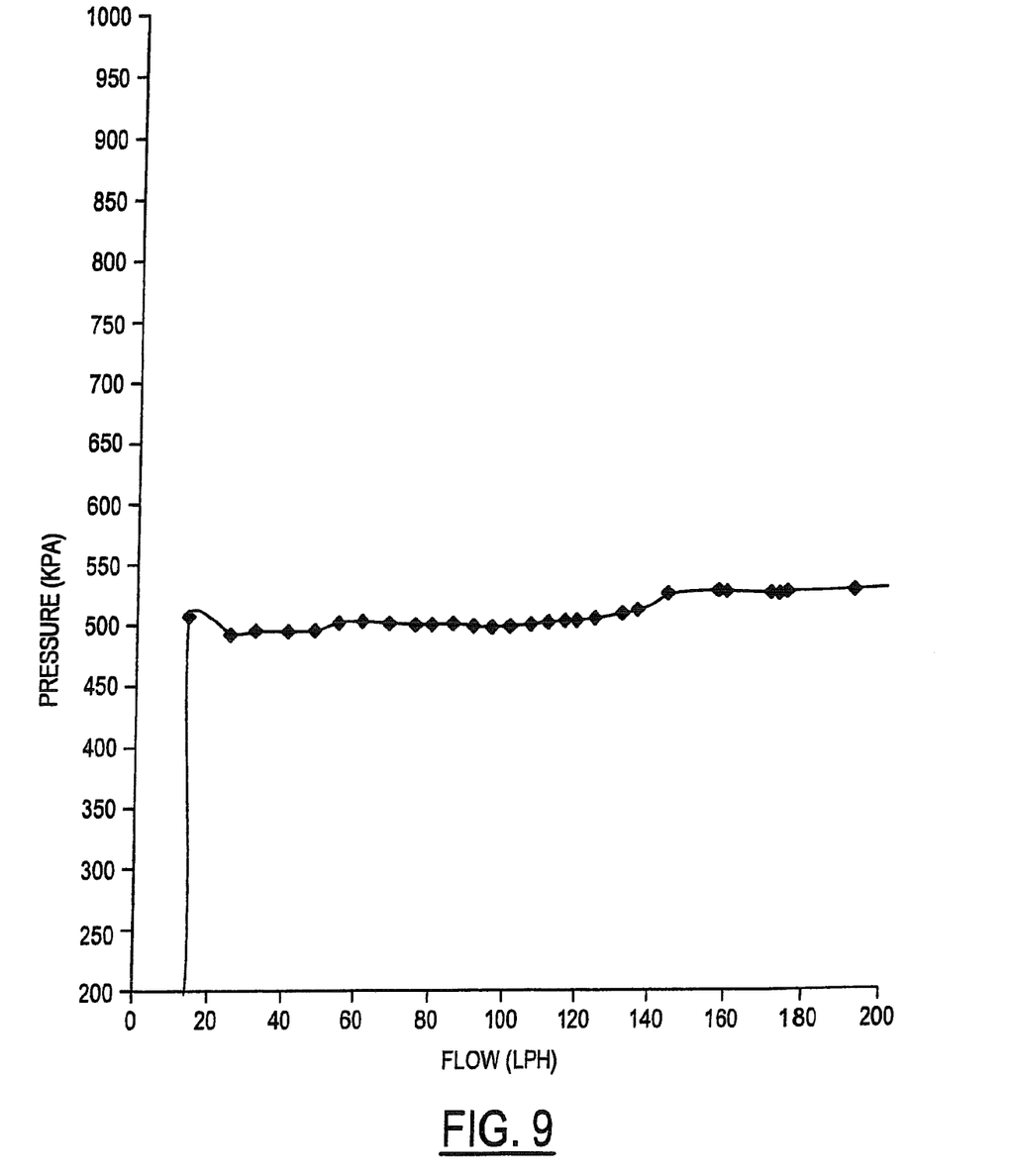
FIG. 9 is a graph of a pressure curve for one exemplary pressure control valve.

During operation, the effective surface area of the valve ball 16 that is acted upon by the fluid upstream of the valve seat 20 is proportional to the interface angle $\alpha$. As the interface angle $\alpha$ increases, the effective surface area of the ball 16 that is subjected to the upstream fluid pressure also increases. For a given fluid pressure, the increased effective surface of the valve ball 16 tends to increase the force acting on the valve ball by the upstream fluid pressure. There is also a factor called the "Bernoulli Effect" that tends to decrease the pressure force on the valve ball 16 due to the velocity of the fluid in the flow gap 22. The "Bernoulli Effect" can be reduced by decreasing the minimum flow gap 22 at a fixed axial position of the ball 16. This force produced by the upstream fluid pressure is offset by the force of the spring 18, which likewise increases as the valve ball 16 is displaced further away from the valve seat 20, causing increased compression of the spring 18. Accordingly, the pressure control valve 10 can be designed to offset the increased spring force as the spring 18 is increasingly compressed, by increasing the effective surface area of the ball 16 and or decreasing the minimum flow gap 22 as the ball 16 is displaced further away from the valve seat 20. In this manner, the valve 10 can be constructed to provide a desired pressure curve or response over a wide range of fluid flow rates. For example, the valve 10 can be designed to have a relatively flat pressure curve over a wide range of flow rates as shown in FIG. 9 wherein the flow rate varies from about 10 or 20 liters per hour to about 200 liters per hour. The fluid flow rates may be even higher, on the order of 250 liters per hour, or more, as needed. Of course the pressure response or curve can be controlled as desired for a desired application or use of a pressure control valve.

One way to design a valve 10 is to determine the desired minimal clearance between the valve ball 16 and the valve bore 14 in various axial displacement positions of the valve ball 16, to oppose as desired the spring force acting on the ball, which is a known function of the spring constant of the spring 18. In other words, for a given displacement of the valve ball 16, the spring force acting on the ball can be readily calculated, and this force can be offset as desired with a desired net force in the opposite direction which is a function of the force of the fluid acting on the valve ball 16. Since the force of the fluid acting on the valve ball 16 is a function of the upstream pressure, axial position, interface angle and minimum flow gap 22, it can be calculated using Computational Fluid Dynamics (CFD) analysis or other numerical analysis. The analysis shows that the force increases as the minimum flow gap 22 is decreased and the force decreases as the minimum flow gap 22 is increased. In this manner, the shape or contour of the concave portion 32 can be iteratively determined with relative precision for a desired pressure characteristic or pressure response of the pressure control valve 10.

When the valve is closed, in other words the valve ball 16 is on the valve seat 20, the interface angle $\alpha$ is preferably between about 5° to about 85°, and more preferably between 35° and 75°. At very low interface angles, there is a relatively small surface area of the valve ball 16 subjected to the upstream fluid pressure, which may adversely affect its responsiveness. On the other hand, at a very large starting interface angle, issues such as corking or the tendency of the valve ball 16 to become stuck on the valve seat 20 can occur. Also, starting at a very large interface angle $\alpha$ reduces the increase in the interface angle $\alpha$ that is possible as the valve ball 16 is displaced because the maximum interface angle with a spherical valve ball is 90°, which is coincident with the diameter of the ball perpendicular to the direction of the fluid flow. In other words, the 90° interface angle $\alpha$ defines the maximum effective surface area of the valve ball 16.

In the embodiment shown in FIGS. 4-7, the interface angle $\alpha$ increases from a nominal angle of about 65° when the valve ball 16 is closed on the valve seat 20, to about 68° in FIG. 5 where the valve ball 16 is shown displaced from its closed position and away from the valve seat 20. In FIG. 6, the valve ball 16 is displaced further away from the valve seat 20 than in FIG. 5 and the interface angle $\alpha$ is shown nominally at about 74°. Finally, in FIG. 7 the valve ball 16 is displaced still further away from the valve seat 20 and the interface angle $\alpha$ is a nominal angle of about 85°. These representative angles are illustrative of only a single presently preferred embodiment, and are not intended to limit the invention.

The frustoconical portion 28 may provide a more consistent interface angle α when the valve ball 16 is seated against the valve seat 20, and may minimize the effect of changes in the valve body 12, such as may occur with use of a plastic valve body immersed in liquid fuel which tends to cause swelling of plastic. Since the interface angle α remains constant in the frustoconical portion 28 with a linearly tapered surface, a change in the valve bore diameter in this area will cause the valve ball 16 to engage the frustoconical portion 28 in a different axial location, but it will not change the interface angle α. Hence, such a change will not change the effective surface area of the valve ball 16 that is acted on by the upstream fluid pressure. In this manner, the "cracking" or initial opening pressure of the valve 10 will not be affected by such changes in the housing.

Figure 8:
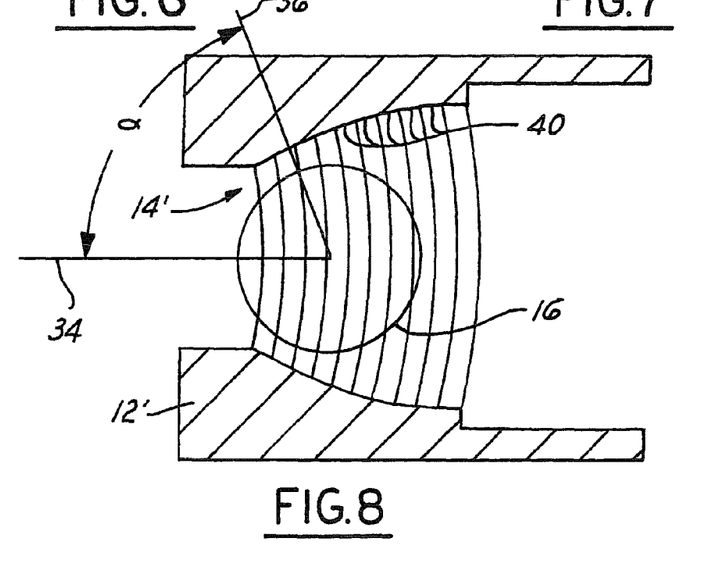
FIG. 8 is a fragmentary sectional view of a pressure control valve constructed according to another presently preferred embodiment of the invention.

If desired, the valve bore 14 can be formed without any frustoconical portion 28. The entire valve bore 14 can be made with a non-linear or non-uniform taper as described with reference to the concave portion 32 of the embodiment just described. The non-uniform taper provides a varying rate of change of the diameter of the valve bore 14 for given increments of axial distance. Alternatively, as shown in FIG. 8, a valve body 12' may have a valve bore 14' with a plurality of linearly tapered segments 40 disposed at different angles from one another. While each individual segment 40 has a straight linear taper, the valve bore 14 as a whole does not have a straight linear taper along its entire axial length. As also shown in FIG. 8, the interface line 36 may be generally perpendicular to the linear segment closest to the valve ball 16, and the interface angle α is defined between the axis 34 of the valve bore 14' and the interface line 36.

Now, one representative method of designing a valve 100 for use with low viscosity fluids will be described wherein a suitable flow gap 102 and valve head or valve ball 104 size can be determined. From the difference in static pressure upstream and downstream of the valve (Delta P), the velocity of fluid in the flow gap can be determined using Bernoulli's equation:

Delta $P=0.5*\text{Density}*\text{Velocity}^2$.

In an example wherein the fluid has a viscosity of 0.75 kg/liter, and a Delta P of 650 kPa, the velocity is about 41.7 m/sec.

The fluid velocity, flow area and flow rate may be related by the continuity equation:

Volumetric flow rate=flow area*velocity.

In a valve where the maximum flow rate is 180 liters/hour, the maximum flow area is about 1.2 mm$^2$. With this flow area in mind, the optimum size of the ball 104 can be determined:

Ball diameter=(flow area$^{0.5}$)*3.

In this example, the ball diameter is about 3.28 mm. Of course, this is an approximate ball diameter and the actual ball 104 can be smaller or larger as needed or desired.

Figure 10:
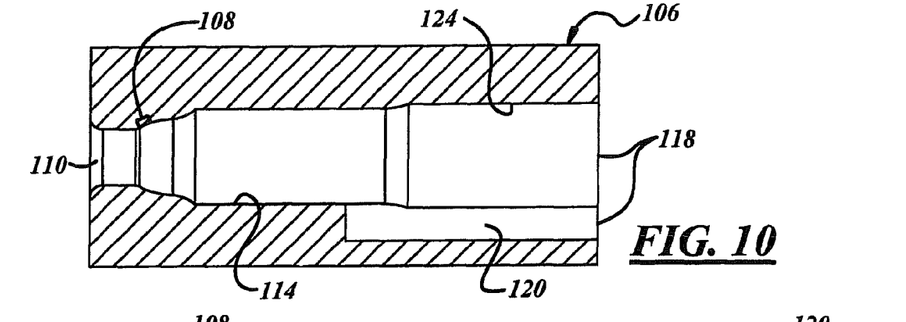
FIG. 10 is a cross sectional view of an alternate embodiment valve housing.
Figure 11:
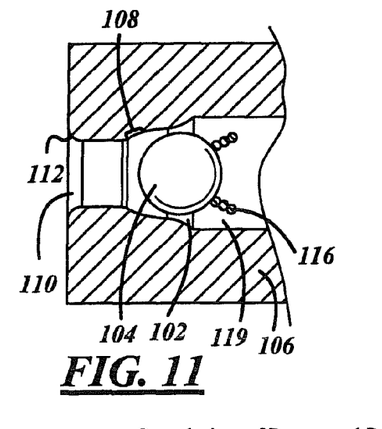
FIG. 11 is a diagrammatic fragmentary sectional view of a portion of a valve.

The geometry of the valve housing 106, as best shown in FIG. 10, can be determined with reference to the size of the ball 104. The valve housing includes a valve seat area 108 and a varying flow gap 102. The size of the upstream entrance hole 110 can be selected to be between about 70% to 90% of the ball diameter, and in one implementation is about 80% of the ball diameter. The valve seat area 108 may have a seating angle of about 25 to 30 degrees, as diagrammatically shown in FIG. 11. More consistent performance of the valve may be realized with a larger entrance hole 110 and a larger radius 112 leading to the entrance hole 110. A larger entrance hole 110 can reduce the pressure drop associated with fluid moving into the entrance hole 110. Further, flash or other irregularities (such as a less round entrance hole 110) will affect the pressure drop at the entrance hole 110, and correspondingly, can affect the performance of the valve 100.

As the ball 104 lifts or moves axially from the valve seat 108 a distance equal to about 25% of its diameter, the flow gap 102 can be less than 5% of the ball diameter, and in some applications, may be about 3.5% of the ball diameter. In this example, as the ball 104 moves axially from the valve seat 108 a distance equal to about 6% and about 15% of the ball diameter, the flow gap may be less than 2% and less than 3%, respectively, of the ball diameter, and such values can be targets for other example valve designs as well. In one implementation, when the valve ball 104 is displaced from the valve seat 108 a distance equal to about 6.2% of the ball diameter the flow gap may be about 1.5% of the ball diameter, and when the valve ball 104 is displaced from the valve seat 108 a distance equal to about 15.6% of the ball diameter the flow gap may be about 2.8% of the ball diameter. A curve connecting these three points corresponding to axial displacement of the ball of about 6.2%, 15.6% and 25% of the ball diameter will form a radiused or arcuate surface. Preferably, the arcuate or radiused shape truncates at or near the valve seat 108. If, in testing of a valve so designed, the resultant pressure drop across the valve is too great at any particular axial displacement of the valve ball, the net flow gap can be decreased at the particular axial displacement of the valve ball.

Empirical data has demonstrated a relationship between the flow rate through the valve 100 and the axial position of the valve ball 104 relative to the valve seat 108. The pressure upstream of the valve 100 determines the velocity of the fluid flow through the flow gap 102 between the valve ball 104 and valve housing 106. CFD analysis has shown that if the size of the entrance hole is decreased the force on the valve ball upstream of the flow gap is decreased. The CFD analysis confirmed that there is an area of low static pressure in the flow gap 102 between the ball 104 and the valve seat 108, and that the high velocity of fluid flow in that area caused the area of low pressure. Increasing the entrance hole 110 diameter decreases the size of the area of low pressure. The area of the low pressure zone can also be decreased by changing the shape of the valve seat 108 to increase the effective displacement of the ball 104. CFD analysis also demonstrated that changing the upstream pressure and/or scaling the geometry of the valve components did not have a significant effect on the ratio of the axial force on the ball to the cracking force necessary to initially open the valve.

The area downstream of the valve seat 108 may influence the performance of the valve in at least two ways. First, it can affect the axial position of the ball 104 at flow rates above the designed flow (since it will control the flow gap upon greater axial displacement of the valve ball). Second, it may effect the diffusion of the fluid that passes through the flow gap 102. If the area downstream of the valve seat 108 is increased (i.e. radiused, tapered, etc), the maximum flow range of the valve can be increased. Although, providing the increasing area can make it more difficult to predict the static pressure on the downstream side of the valve ball. When fluid diffuses on the downstream side of the ball 104, the resultant forces on the ball oppose the axial displacement of the ball away from the valve seat 108 and can contribute to instability of the valve.

The size of the spring guide area 114 of the valve housing 106 can influence the straightness of the spring 116 and the fluid restriction associated with the flow of fluid around the head of the spring 116. Spring guides 114 smaller in diameter than an exit hole(s) 118 of the valve have been tested with good results. For example, in one tested valve the exit hole 118 was about 4.55 mm and the spring guide area 114 was about 4.25 mm in diameter. If the spring guide 114 is too small the valve may exhibit a pressure drop discontinuity at high flow rates.

Figure 12:
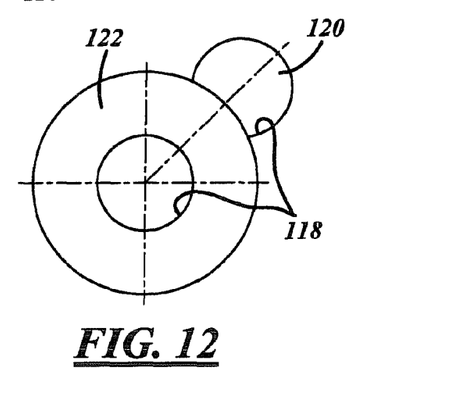
FIG. 12 is a diagrammatic end view of an exit path and openings of a valve housing.

The side slot 120 may provide two functions: It can allow an increased flow area downstream of the valve seat 108 and may also reduce the possibility that the valve will be built without a spring 116. If the side slot 120 is not utilized, and a fuel pump including a valve or a valve itself is built without a spring 116, the ball 104 will seal against a spring retainer 122 and it can appear that the valve is functioning properly when it is not.

A retainer zone 124 of the valve housing 106 should be coaxial with the axis of the housing and have sufficient wall thickness to avoid movement of the retainer 122. Movement of the retainer 122 would affect, for example, the spring force on the valve ball 104. In one valve the retainer zone diameter is 4.55 mm+/−0.05 mm and preferably has a wall thickness of at least 2 mm.

The exit hole(s) 118 design can help control, and preferably minimize, the maximum pressure at maximum flow through the valve. Exit hole flow area can affect the pressure drop across the valve. If the exit hole flow area is too small the pressure drop across the valve will increase.

Figure 13:
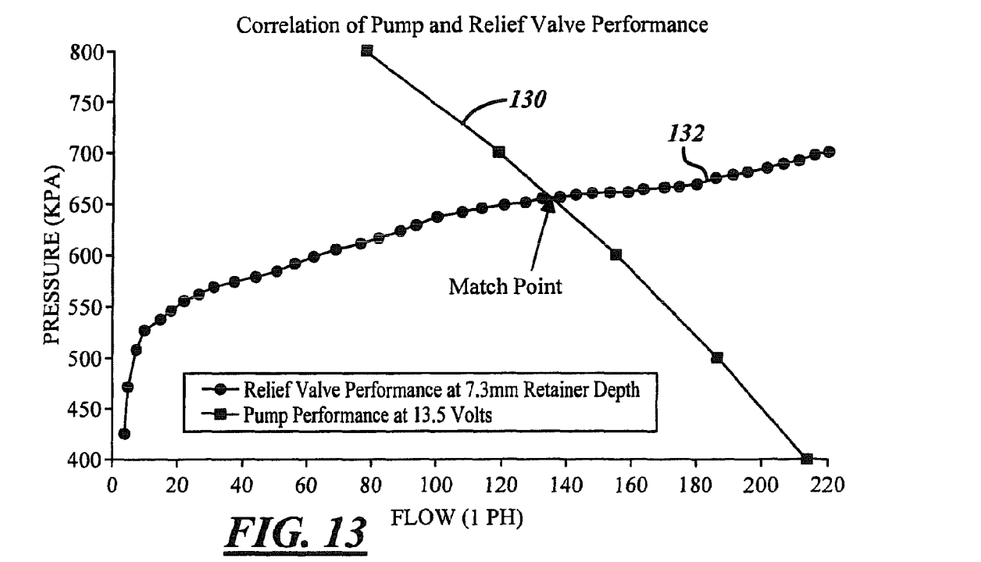
FIG. 13 is a graph of flow versus pressure showing, among other things, correlation of fuel pump and valve performance.

Such valves can be used in fluid pumps, like fuel pumps, downstream of an outlet of the fuel pump (e.g. downstream of the fuel pump, or carried in a housing of a fuel pump through which fuel is discharged under pressure). Typically, as shown by the line 130 in FIG. 13, the flow rate of fluid discharged from a fuel pump (such as the electric motor driven pumps commonly used in automotive or other vehicle applications) decreases as the pressure of the fluid is increased. Conversely, as shown by line 132, the fluid flow through the valve may increase as the pressure of the fluid is increased. From this information, a proper valve size and design can be chosen to work with and in a wide range of applications, such as a wide range of fuel pumps that may operate at different pressures and flow rates.

Figure 14:
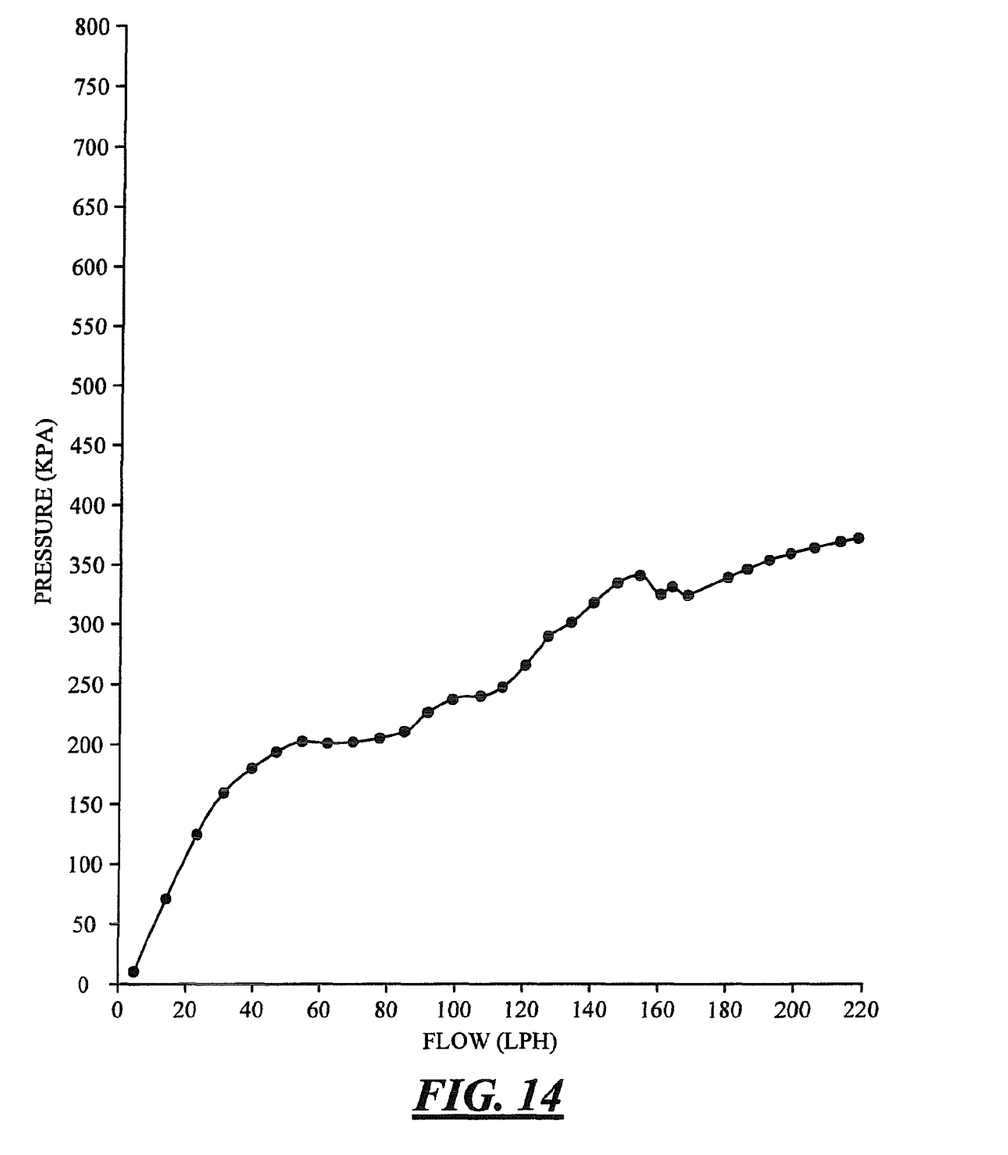
FIG. 14 is a graph of flow versus pressure of an exemplary valve having a valve retainer at a first position providing a first spring force on the valve head.
Figure 15:
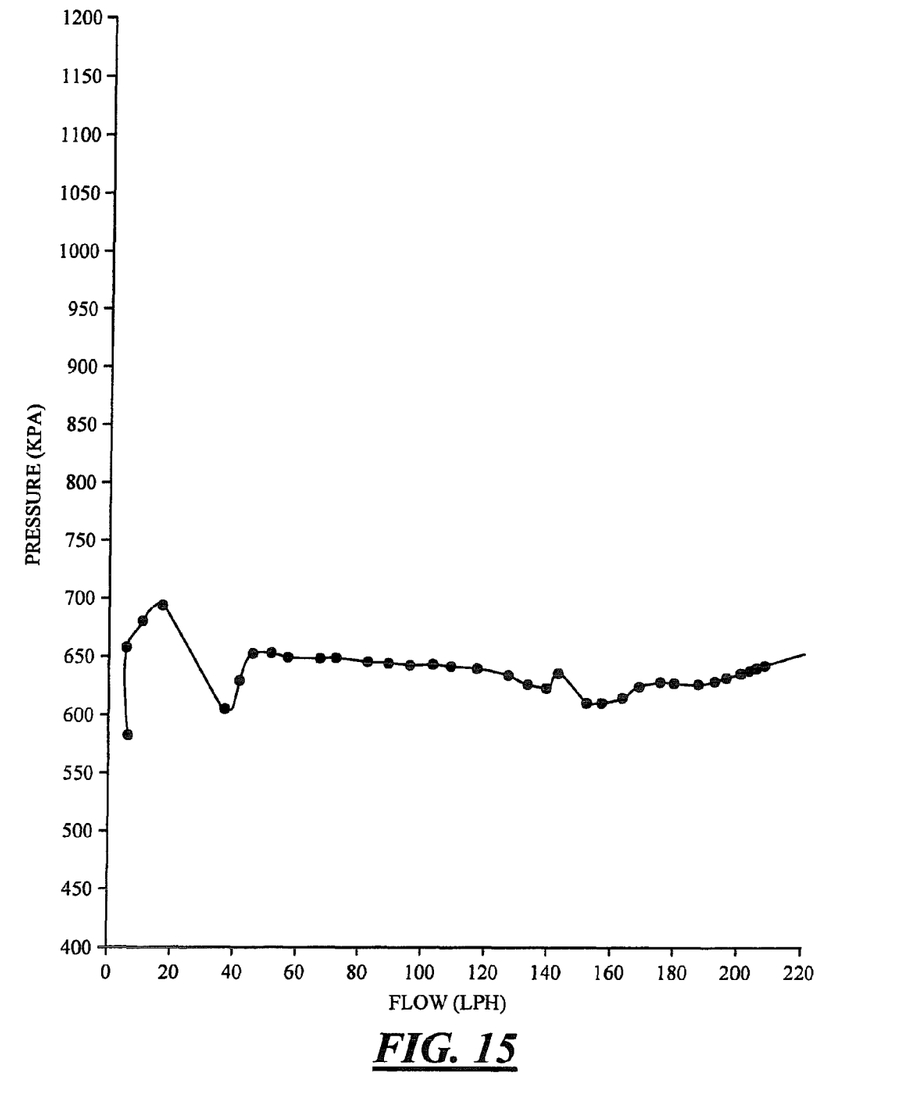
FIG. 15 is a graph of flow versus pressure of an exemplary valve having a valve retainer at a second position providing a first spring force on the valve head.
Figure 16:
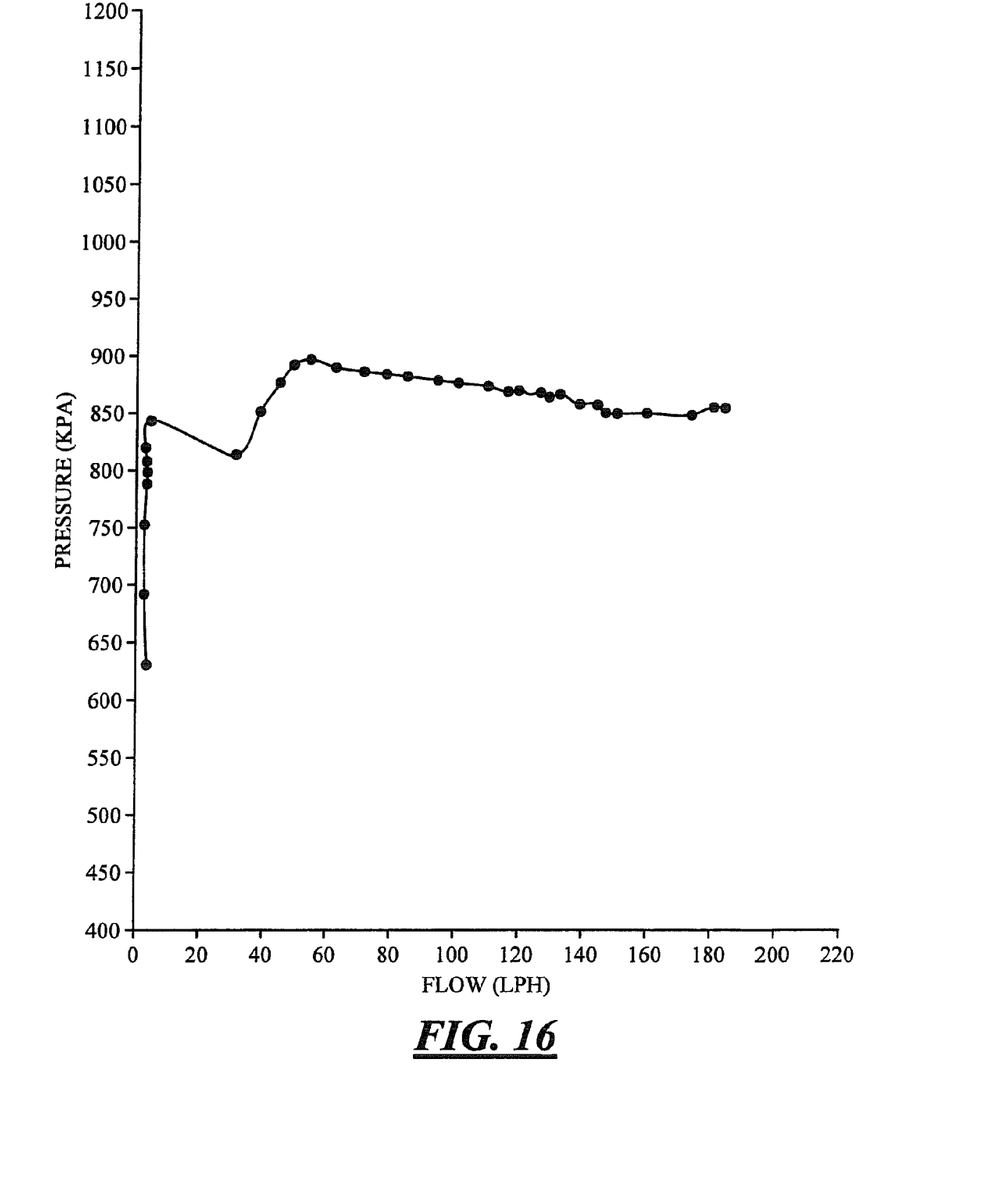
FIG. 16 is a graph of flow versus pressure of an exemplary valve having a valve retainer at a first position providing a first spring force on the valve head.

Further, FIGS. 14-16 show CFD analysis charts of one valve design set to operate at several different pressures, such as by changing the spring force which may be done by moving the retainer and thereby changing the compression of the spring. As shown by FIG. 14, with the retainer set at a nominal depth of 3.5 mm from the end of the valve housing, the valve operated at a pressure of about 150 to 170 kPa over a range of flow rates from about 20 liters/hour to about 80 liters/hour. As shown in FIG. 15, with the retainer set at a depth of about 7 mm, the valve operated at about 650 kPa over a range of flow rates from about 40 liters/hour to over 200 liters/hour. In this exemplary embodiment, the valve was designed for a pressure of about 650 kPa and exhibits a generally linear curve over a wide range of flow rates. As shown in FIG. 16, with the retainer set at a depth of about 8.5 mm, the valve operated at between about 850 and 900 kPa over a range of flow rates between about 40 liters/hour to over 200 liters/hour. Accordingly, a single valve design can be used in a wide range of applications depending on the flow rate and pressure requirements.

Of course, still other modifications, variations or arrangements will be apparent to those of ordinary skill in the art. The preceding description of the presently preferred embodiments of the invention has been provided in terms of illustration, and not limitation. Several alternate constructions and arrangements have been disclosed, and as mentioned above, others will be apparent to persons of ordinary skill in the art, all of which fall within the spirit and scope of the invention as defined by the appended claims. For example, without limitation, the valve head has been shown as a spherical valve ball, but the valve head could take on other shapes or arrangements, as desired for an application or use of the valve.

I claim:

1. A pressure control valve, comprising:
   a valve body having a valve bore with an entrance passage, a valve seat, an exit passage and a longitudinal axis, the valve bore having at least one surface between the valve seat and the exit passage which in cross-section in a plane containing the longitudinal axis has a diameter that varies and increases non-uniformly from its upstream end closest to the valve seat to its downstream end for given equal increments of axial displacement along the longitudinal axis;
   a valve head received at least in part in the valve bore downstream of the valve seat, yieldably biased to a closed position against the valve seat, and being movable to all of its open positions spaced from the valve seat against the bias without ever engaging any stop limiting the opening of the valve head to regulate the pressure of fluid flowing through the valve bore downstream of the valve head;
   the minimum diameter of the entrance passage being 70% to 90% of the diameter of the valve head;
   adjacent surfaces of the valve head and valve bore between which the fluid flows being configured to define an interface angle at least when the valve head is displaced from the valve seat, the interface angle being defined between said longitudinal axis and an interface line intersecting a point on the valve head surface closest to the valve bore surface and a point of the valve bore surface closest to the valve head surface so that the interface angle increases as the valve head is increasingly displaced from the valve seat;
   the valve head and the valve bore being configured so that when the valve head is on the valve seat, the interface angle is in the range of 35° to 75° and when the valve head is moved axially downstream of the valve seat an axial distance equal to 6% of the diameter of the valve head, the minimum flow gap between them is less than 2% of the diameter of the valve head to provide downstream of the valve head at the exit passage a wide range of flow rates of fluid through the valve bore; and
   downstream of the valve head when the valve head is spaced from the valve seat the area through which fluid flows in cross section is greater than the maximum cross-sectional area of the valve head.

2. The pressure control valve of claim 1 which also comprises a spring yieldably biasing the valve head against the valve seat, the spring being disposed downstream of the valve head such that increasing displacement of the valve head away from the valve seat causes increasing displacement of the spring.

3. The pressure control valve of claim 1 wherein the valve bore has a concave portion with a diameter that increases non-linearly as the concave portion extends downstream.

4. The pressure control valve of claim 1 wherein the concave portion is generally arcuate.

5. The pressure control valve of claim 1 wherein the valve head is a spherical valve ball having a diameter that is greater than the diameter of the valve bore in the area of the valve seat.

6. The pressure control valve of claim 5 wherein the interface line intersects the center of the valve ball and the location of the valve bore closest to the valve ball.

7. The pressure control valve of claim 2 wherein the spring is a coil spring having a spring rate and increased displacement of the valve head away from the valve seat causes an increase in the force of the spring acting on the valve head, the valve bore being constructed so that the interface angle increases as a function of the increasing force of the spring acting on the valve head.

8. The pressure control valve of claim 7 wherein the interface angle increases as a function of the spring rate of the spring to offset the increased spring force that acts on the valve head as the valve head is increasingly displaced from the valve seat.

9. A pressure control valve, comprising:
a valve body having a valve bore with an entrance passage, a valve seat, an exit passage and a longitudinal axis, the valve bore having at least one surface between the entrance passage and the exit passage which in cross-section in a plane containing the longitudinal axis has a diameter that varies and increases non-uniformly from its upstream end closest to the valve seat to its downstream end for given equal increments of axial displacement along the longitudinal axis, and the valve bore extends further downstream to a fluid exit;
a valve ball having a surface, yieldably biased to a closed position against the valve seat, and being movable against the bias to open positions spaced from the valve seat without engaging any stop limiting movement of the valve ball away from the valve seat to regulate the pressure of fluid flowing through the valve bore downstream of the valve ball;
the surfaces of the valve bore and valve ball are configured to define an interface angle between said longitudinal axis and a line intersecting a center of the valve ball and the location of the valve bore surface closest to the valve ball surface, and said interface angle increases as the valve ball is increasingly displaced from the valve seat;
the minimum diameter of the entrance passage being 70% to 90% of the diameter of the valve ball;
the valve ball and the valve bore being configured so that when the valve ball is on the valve seat, the interface angle is in the range of 35° to 75° and when the valve ball is moved axially downstream of the valve seat an axial distance equal to 6% of the diameter of the valve ball, the minimum flow gap between them is less than 2% of the diameter of the valve ball to provide downstream of the valve bore a range of flow rates of fluid through the valve bore; and
downstream of the valve ball when the valve ball is spaced from the valve seat and to the exit the area through which fluid flows in cross section is greater than the maximum cross-sectional area of the valve ball.

10. The pressure control valve of claim 9 which also comprises a spring yieldably biasing the valve ball against the valve seat, the spring being disposed downstream of the valve ball such that increasing displacement of the valve ball away from the valve seat causes increasing displacement of the spring.

11. The pressure control valve of claim 9 wherein the valve bore has a concave portion with a diameter that increases non-linearly as the concave portion extends downstream.

12. The pressure control valve of claim 9 wherein the concave portion is generally arcuate.

13. The pressure control valve of claim 10 wherein the spring is a coil spring having a spring rate wherein increased displacement of the valve ball away from the valve seat causes an increase in the force of the spring acting on the valve ball, the valve bore being constructed so that the interface angle increases as a function of the increasing force of the spring acting on the valve ball.

14. The pressure control valve of claim 13 wherein the interface angle increases as a function of the spring rate of the spring to offset the increased spring force that acts on the valve ball as the valve ball is increasingly displaced from the valve seat.

15. The pressure control valve of claim 14 wherein the interface angle increases as the valve ball is increasingly displaced from the valve seat so that the valve has a substantially constant pressure response for fluid flow rates through the valve of between 40 liters per hour and 250 liters per hour.

16. A method of making a pressure control valve, comprising the steps of:
providing a valve bore in a valve body so that the valve bore has a longitudinal axis, an entrance passage, a valve seat, an exit passage, and at least one non-uniform surface which extends away from the valve seat and in cross-section in a plane containing the longitudinal axis has a diameter that varies and increases non-uniformly for given equal increments of axial displacement along the longitudinal axis as the non-uniform surface extends downstream away from the valve seat;
providing a valve head and configuring the entrance passage so that the minimum diameter of the entrance passage being 70% to 90% of the diameter of the valve head;
inserting the valve head into the valve bore, the valve head having a surface with a diameter greater than the diameter of the valve bore in the area of the valve seat but less than the diameter of the valve bore in the area of the non-uniform surface of the valve bore;
inserting a spring at least partially in the valve bore so that one end of the spring engages and yieldably biases the valve head toward the valve seat and when the valve head is spaced from the valve seat the valve head does not engage any stop;
configuring the non-uniform surface of the valve bore so that at least when the valve head is displaced from the valve seat, an interface angle is defined between the longitudinal axis and an interface line intersecting a point on the valve head surface closest to the non-uniform surface of the valve bore and a point on such valve bore surface closest to the valve head surface, and said step of forming the valve bore includes forming the non-uniform surface of the valve bore so that the interface angle increases as the valve head is increasingly displaced from the valve seat to provide downstream of the valve head a wide range of flow rates of fluid through the valve bore;
configuring the non-uniform surface of the valve bore so that when the valve head is moved axially downstream of the valve seat a distance equal to 6%, 15% and 25% of the diameter of the valve head the minimum flow gap between the ball head and the non-uniform surface of the valve bore is less than 2%, 3% and 5% respectively of the diameter of the valve head; and
configuring the valve bore so that when the valve head is spaced from the valve seat, downstream of the valve head and to the exit of the exit passage, the area through which fluid flows in cross section is greater than the maximum cross-sectional area of the valve head.

17. The method of claim 16 wherein the step of providing the non-uniform surface of the valve bore so that the interface angle increases as the valve head is increasingly displaced from the valve seat includes, calculating the spring force at a plurality of various positions of the valve head increasingly axially spaced from the valve seat, calculating for each of such position the flow area between the valve head and the non-uniform surface at the interface angle for such position through which fluid flows at a predetermined pressure producing a force on the valve head offsetting the spring force at each such position of the valve head, and then forming the non-uniform surface of the valve bore with a shape that provides substantially such calculated area at such interface angle at each such position of the valve head.

18. The method of claim 17 wherein such fluid flow area for each such position is calculated to have a net force on the valve head that offsets the increase in the spring force acting on the valve head as the valve head is increasingly displaced from the valve seat so that the pressure control valve has a substantially constant pressure response over a range of positions of the valve head relative to the valve seat.

19. The pressure control valve of claim 9 wherein the valve ball and the valve bore are configured so that when the valve ball is moved axially downstream of the valve seat an axial distance equal to 15% of the diameter of the valve ball, the minimum flow gap between them is less than 3% of the diameter of the valve ball.

20. The pressure control valve of claim 9 wherein the valve ball and the valve bore are also configured so that when the valve ball is moved axially downstream of the valve seat an axial distance equal to 25% of the diameter of the valve ball, the minimum flow gap between them is less than 5% of the diameter of the valve ball.

21. The pressure control valve of claim 9 wherein the valve ball and the valve bore are also configured so that when the valve ball is moved axially downstream of the valve seat an axial distance equal to 15% of the diameter of the valve ball, the minimum flow gap between them is less than 3% of the diameter of the valve ball, and when the valve ball is moved axially downstream of the valve seat an axial distance equal to 25% of the diameter of the valve bore, the minimum flow gap between them is less than 5% of the diameter of the valve bore.

22. The pressure control valve of claim 1 wherein the minimum flow gap between the valve head and the valve bore is configured so that the pressure control valve has a pressure response varying by less than 50 kPa for fluid flow rates through the pressure control valve of between 40 liters per hour and 200 liters per hour.

23. The pressure control valve of claim 9 wherein the minimum flow gap between the valve ball and the valve bore is configured so that the pressure control valve has a pressure response varying by less than 50 kPa for fluid flow rates through the pressure control valve of between 40 liters per hour and 200 liters per hour.

24. The method of making a pressure control valve of claim 16 wherein the minimum flow gap between the valve head and the valve bore is configured so that the pressure control valve has a pressure response varying by less than 50 kPa for fluid flow rates through the pressure control valve of between 40 liters per hour and 200 liters per hour.

* * * * *